(12) United States Patent
Moultrie

(10) Patent No.: US 8,361,600 B1
(45) Date of Patent: Jan. 29, 2013

(54) MORE INTERACTIVE STANCE MAT

(76) Inventor: Richard E. Moultrie, Bothell, WA (US)

( * ) Notice: Subject to any disclaimer, the term of this patent is extended or adjusted under 35 U.S.C. 154(b) by 0 days.

(21) Appl. No.: 13/385,010

(22) Filed: Jan. 27, 2012

(51) Int. Cl.
 *B32B 3/28* (2006.01)
 *B32B 3/30* (2006.01)
 *A47G 9/06* (2006.01)

(52) U.S. Cl. ............ 428/182; 428/178; 428/186; 5/417

(58) Field of Classification Search .................. 428/182, 428/183, 184, 185, 186, 188, 178, 166, 304.4; 5/417, 420; 15/215, 216, 217; 4/581
See application file for complete search history.

(56) References Cited

U.S. PATENT DOCUMENTS

| | | | | |
|---|---|---|---|---|
| 3,423,263 A | * | 1/1969 | Lester | 156/79 |
| 3,654,063 A | * | 4/1972 | Blackburn et al. | 428/172 |

* cited by examiner

Primary Examiner — Catherine A Simone

(57) ABSTRACT

An Interactive Stance Mat designed for comfort or rhythmic physical activity short of exercise. Invention is interactive by means of user weight shifts ranging from nuanced to purposeful. Characteristic viscoelastic lag response in cycles provides more tactility to user than elastic force. Mat comprises top mounted flexible planar panel aligned with corrugated foamed polycarbonate-corrugation panel, where it is often unified with planar panel in sections. One or the other panel, but not both, may comprise sections. Attachment unifying the panels comprises a method where corrugation can expand freely and prevent material failure; the method comprises fixing attachment not restraining two or more of the corrugation panels expandable parts. User weight shifts are more interactive with gravity and its reaction forces than mats in the art. Modes of the invention reflect desired motion through selection of planar panel flexibility, and size, configuration of the corrugation panel.

7 Claims, 5 Drawing Sheets

MORE INTERACTIVE STANCE MAT

BACKGROUND OF THE INVENTION

The first consideration for identifying the likely classification of the invention is recognition that a physical activity threshold of exercise/conditioning is not intended, and not likely achieved using the invention. Functionally, this Interactive Stance Mat provides relief from gravity typical to gel mats. It provides a dynamic interaction alternative to static sitting posture; an opportunity to structurally register the spine/posture using rhythmic motion; a cushion to gravity and more interactive with ground reaction forces than found in the comfort mat art. Invention field could be Stance Mat or Exercise Mechanism under class 482, or a new sub class. Inventor prefers to view the invention as a mat based on its structure and larger commercial market. Invention is directed to health and comfort, not conditioning. Physical properties of the mechanisms viscoelastic structure place it in a different category than known elastic devices; it is much less forceful in elastic response. It has the characteristic lag response common in viscoelasticity, reaction at a level generally only tactile to the user. Inventor is not sure of the applicable art.

BRIEF SUMMARY OF THE INVENTION

This mat mechanism comprises a flexible planar platform and a foamed polycarbonate corrugation base having viscoelastic characteristics. Interaction is natural motion to humans; here, function is based on nuanced, or more active, weight shifts by the user. It has a small size mode for home and office applications. It is well known that short periods of non-static stance can have substantial physiological benefit. In another less flexible mode, it provides relief from gravity, cushioning with less dynamics. Significance of the invention design, and the nexus between long sitting and long standing patterns, lies with the fact that gravity can be harmful but it is also necessary to human health. Invention is compatible with theory in physiology that a cycle of motion moving between stress and relaxation is the most beneficial.

BRIEF DESCRIPTION OF SEVERAL VIEWS OF THE DRAWINGS

FIGS. 2 and 3 also demonstrate use of different ridge tops utilized for a fixing radial ridge attachment (#5).

DETAILED DESCRIPTION OF THE INVENTION

Figure 1:
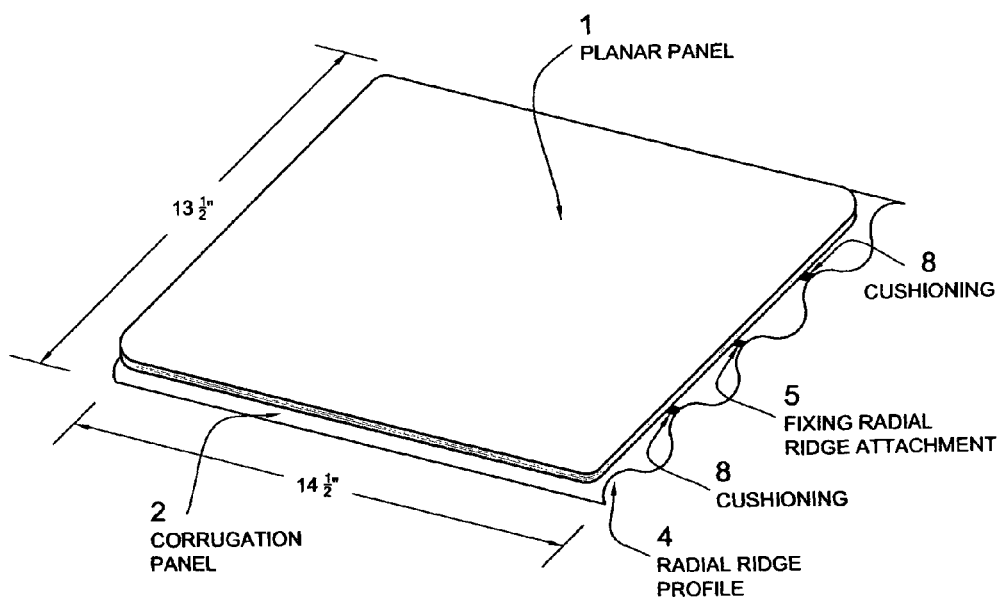
FIG. 1, shows a small to midsized Interactive Stance Mat where panels do not have sections (#1 and #2), where attachment comprises fixing located at a radial ridge (#5) interface between the panels (#1) and (#2), and where cushioning (#8) is provided between the panels and the ridge tops.
Figure 2:
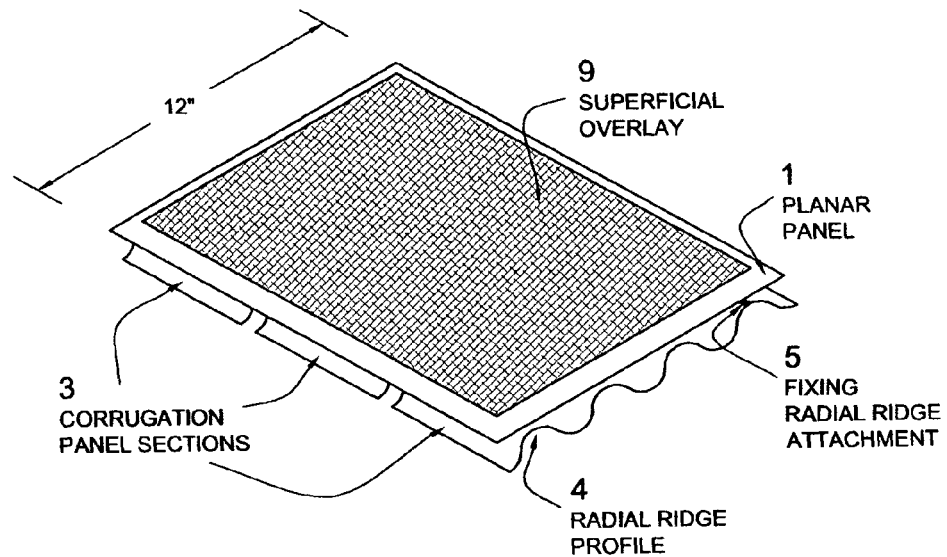
FIGS. 2 and 3 illustrate the difference between a corrugation panel with (#3) and without (#2) sections.
Figure 4:
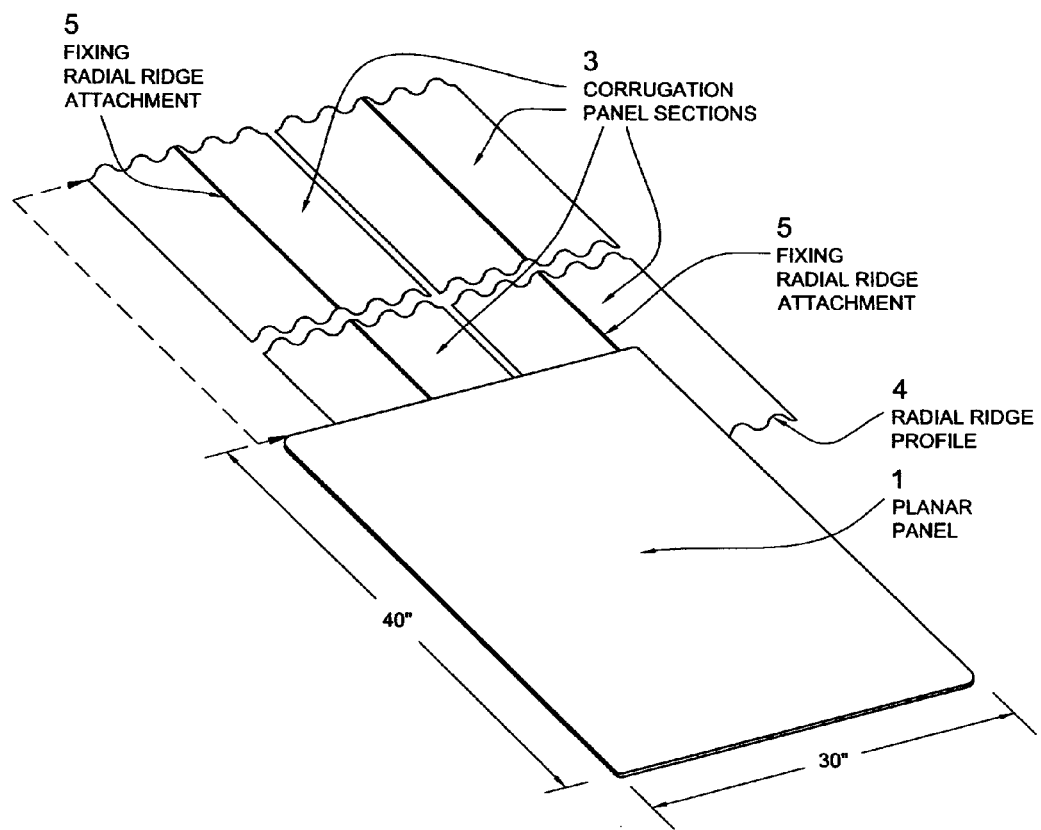
FIG. 4 illustrates a larger product comprising planar panel (#1) attached at fixing radial ridge (#5) of four sections (#3).

Invention comprises a flexible planar panel, FIG. 1 (#1), aligned and united with all or part of a foamed polycarbonate corrugation panel, (#2), where a fixing attachment (#5) is usually made at a single radial ridge (#5) interface location, and can include sections, FIG. 2 (#3), where attaching at a single radial ridge location, (#5), of each section is made. FIG. 2 (#3) allows for its viscoelastic function and protects the structural integrity of the corrugation. Planar panel, FIG. 1 (#1), is usually one section, however, the planar can be two sections, FIG. 5 (#10). FIG. 4 (#3) shows the corrugation panel having four sections.

A unifying principal demonstrated in the invention is when one of the two panels is divided, the other panel is not. Providing cushioning, FIG. 1 (#8), between panels and providing superficial overlays, FIGS. 2 and 3 (#9), for comfort, aesthetics, or the like are claimed options. Sizes of the mat vary to a considerable degree, compare FIG. 1 and FIG. 4. Invention has no bias whether the corrugation(s) at their ends point up or down, or otherwise as to ridge patterns; see example of down in FIGS. 2 and 3, at radial ridge profile, (#4), and up, FIGS. 6 (#4) and 7 (#4). The up position is more compatible with flex/slack attachment, FIG. 7 (#7). Corrugated material used in the invention is likely to fatigue under load cycles going past the planar position. Inventiveness includes attachment method where two or more of corrugations expandable parts, being places, are not mutually restrained protecting corrugations structural integrity and expansion function. Desired motion can be influenced by factory selection of the planar elements size and flexibility, and with size and configuration of the corrugation panel, or its sections, or by way of branches of the same. Utility of the invention lies with user interactive values, cushioning gravity and facilitating interaction with reaction forces; producing both comfort and health. Manner of using the invention is intuitive being natural with non-static stance; here, it is passive dynamic stance through the interaction with viscoelastic function; where expansion is parallel with ridges; where the forces are generally only tactile, determined proportional to user rhythm; when user seeks only cushioning of gravity, weight shifts can be more nuanced. It is known that gravity is constant weight acting uniformly through the body, and ground reaction forces are the more deforming causes of body stress build up. It is also known that ground reaction forces are the key to muscle and bone health, where the ideal cycle is alternating stress and relaxation. Invention is effective in providing for this beneficial cycle, more nuanced seeking stance comfort, providing more motion interaction with active weight shifts. Making the invention is made obvious with the drawings, descriptions and identification of suitable materials widely used and available. When the corrugation is divided into sections, non-restraining attachment is made at each section, thereby unifying the mat. Non-restraining attachment can be provided at just one perimeter, FIG. 6 (#6), interface, where expansion will be in the opposite direction; fixing at a ridge crown location, FIG. 1 (#5), causing expansion generally, but not always in two directions; or attachment at two perimeter interfaces with flex/slack fixing, FIG. 7 (#7) FIG. 1 and FIG. 4 represent preferred embodiments of the invention described here, and In the Detailed Description of the Drawings, FIG. 1 represents mode to carry out the invention and is selected to be the featured drawing.

What I claim as my invention is:

1. An interactive stance mat comprising a flexible planar panel comprising one or more sections, attached, aligned with foamed polycarbonate corrugation panel comprising a radial ridge profile and one or more sections with one or more branches; where corrugation function under load is preserved where said attachment provides for unrestrained expansion.

2. A method of attachment for an interactive stance mat comprising a flexible planar panel comprising one or more sections, attached, aligned with a foamed polycarbonate corrugation panel comprising a radial ridge profile and one or more sections with one or more branches; where said method comprises said attachment, where no two of said corrugation panel expandable parts, comprising places, are mutually restrained.

3. The method of claim 2, further comprising fixing attachment with each corrugation section at a single radial ridge crown.

4. The method of claim 2, further comprising fixed attachment at one perimeter panel interface location of said mat.

5. The method of claim 2, further comprising attachment at two or more perimeter interface locations of said mat providing flex or slack attachment.

6. The stance mat of claim 1, further comprising cushioning underlying said planar panel.

7. The stance mat of claim 1, further comprising superficial overlay on said planar panel.

* * * * *

UNITED STATES PATENT AND TRADEMARK OFFICE
CERTIFICATE OF CORRECTION

| | | |
|---|---|---|
| PATENT NO. | : 8,361,600 B1 | Page 1 of 9 |
| APPLICATION NO. | : 13/385010 | |
| DATED | : January 29, 2013 | |
| INVENTOR(S) | : Richard E. Moultrie et al. | |

It is certified that error appears in the above-identified patent and that said Letters Patent is hereby corrected as shown below:

Please delete patent 8,361,600 B1 in its entirety and insert patent 8,361,600 B1 in its entirety. (as shown on the attached sheets)

Signed and Sealed this
Fifteenth Day of April, 2014

Michelle K. Lee
*Deputy Director of the United States Patent and Trademark Office*

(12) United States Patent
Moultrie

(10) Patent No.: US 8,361,600 B1
(45) Date of Patent: Jan. 29, 2013

(54) MORE INTERACTIVE STANCE MAT

(76) Inventor: Richard E. Moultrie, Bothell, WA (US)

( * ) Notice: Subject to any disclaimer, the term of this patent is extended or adjusted under 35 U.S.C. 154(b) by 0 days.

(21) Appl. No.: 13/385,010

(22) Filed: Jan. 27, 2012

(51) Int. Cl.
*B32B 3/28* (2006.01)
*B32B 3/30* (2006.01)
*A47G 9/06* (2006.01)

(52) U.S. Cl.
USPC ............... 428/182; 428/178; 428/186; 5/417

(58) Field of Classification Search ............... 428/182, 428/183, 184, 185, 186, 188, 178, 166, 304.4; 5/417, 420; 15/215, 216, 217; 4/581
See application file for complete search history.

(56) References Cited

U.S. PATENT DOCUMENTS 3,423,263 A * 1/1969 Lester ........................... 156/79
3,654,063 A * 4/1972 Blackburn et al. ............ 428/172

* cited by examiner

*Primary Examiner* — Catherine A Simone

(57) ABSTRACT

An Interactive Stance Mat designed for comfort or rhythmic physical activity short of exercise. Invention is interactive by means of user weight shifts ranging from nuanced to purposeful. Characteristic viscoelastic lag response in cycles provides more tactility to user than elastic force. Mat comprises top mounted flexible planar panel aligned with corrugated foamed polycarbonate-corrugation panel, where it is often unified with planar panel in sections. One or the other panel, but not both, may comprise sections. Attachment unifying the panels comprises a method where corrugation can expand freely and prevent material failure; the method comprises fixing attachment not restraining two or more of the corrugation panels expandable parts. User weight shifts are more interactive with gravity and its reaction forces than mats in the art. Modes of the invention reflect desired motion through selection of planar panel flexibility, and size, configuration of the corrugation panel.

7 Claims, 5 Drawing Sheets

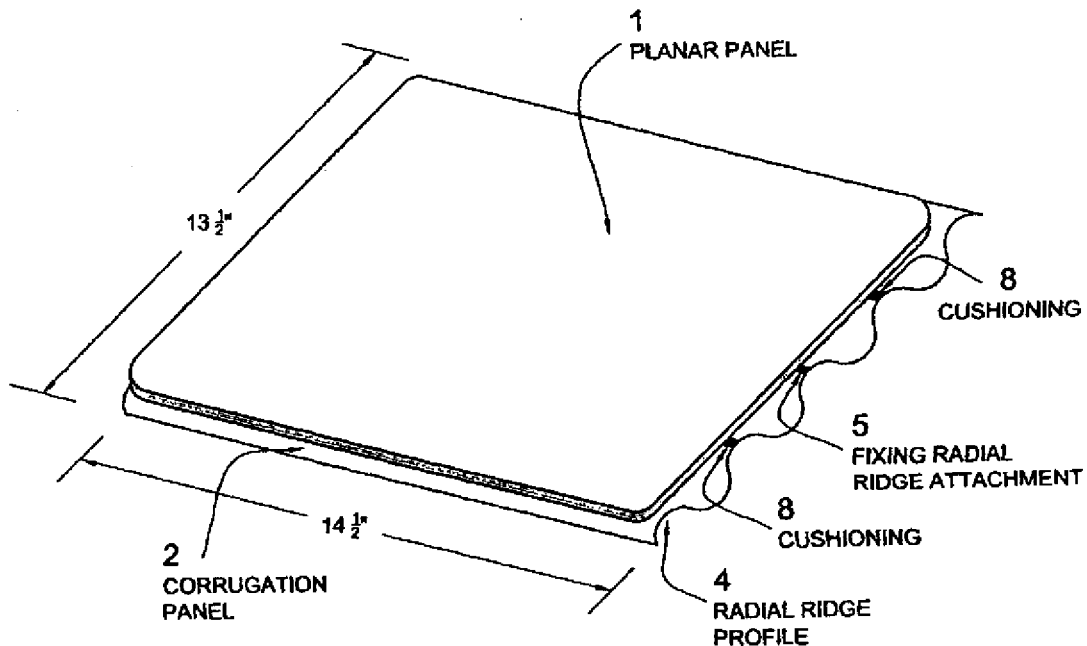

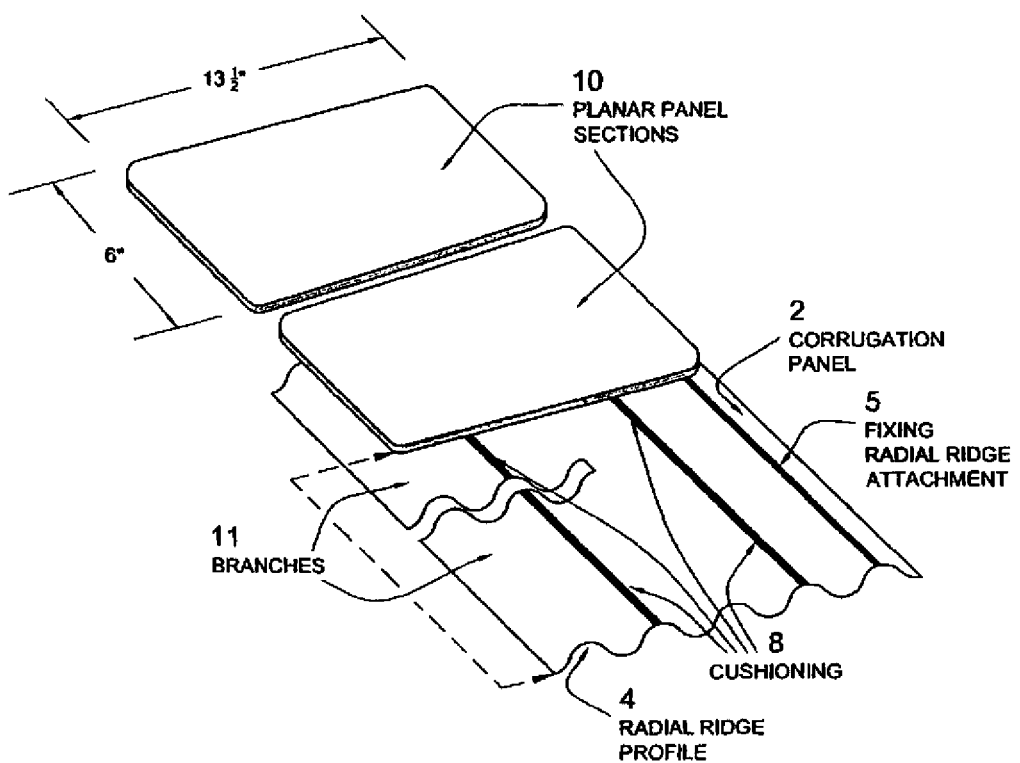

MORE INTERACTIVE STANCE MAT

BACKGROUND OF THE INVENTION

The first consideration for identifying the likely classification of the invention is recognition that a physical activity threshold of exercise/conditioning is not intended, and not likely achieved using the invention. Functionally, this Interactive Stance Mat provides relief from gravity typical to gel mats. It provides a dynamic interaction alternative to static sitting posture; an opportunity to structurally register the spine/posture using rhythmic motion; a cushion to gravity and more interactive with ground reaction forces than found in the comfort mat art. Invention field could be Stance Mat or Exercise Mechanism under class 482, or a new sub class. Inventor prefers to view the invention as a mat based on its structure and larger commercial market. Invention is directed to health and comfort, not conditioning. Physical properties of the mechanisms viscoelastic structure place it in a different category than known elastic devices; it is much less forceful in elastic response. It has the characteristic lag response common in viscoelasticity, reaction at a level generally only tactile to the user. Inventor is not sure of the applicable art.

BRIEF SUMMARY OF THE INVENTION

This mat mechanism comprises a flexible planar platform and a foamed polycarbonate corrugation base having viscoelastic characteristics. Interaction is natural motion to humans; here, function is based on nuanced, or more active, weight shifts by the user. It has a small size mode for home and office applications. It is well known that short periods of non-static stance can have substantial physiological benefit. In another less flexible mode, it provides relief from gravity, cushioning with less dynamics. Significance of the invention design, and the nexus between long sitting and long standing patterns, lies with the fact that gravity can be harmful but it is also necessary to human health. Invention is compatible with theory in physiology that a cycle of motion moving between stress and relaxation is the most beneficial.

BRIEF DESCRIPTION OF SEVERAL VIEWS OF THE DRAWINGS

FIG. 1, shows a small to midsized Interactive Stance Mat where panels do not have sections (#1 and #2), where attachment comprises fixing located at a radial ridge (#5) interface between the panels (#1) and (#2), and where cushioning (#8) is provided between the panels and the ridge tops.

Figure 3:
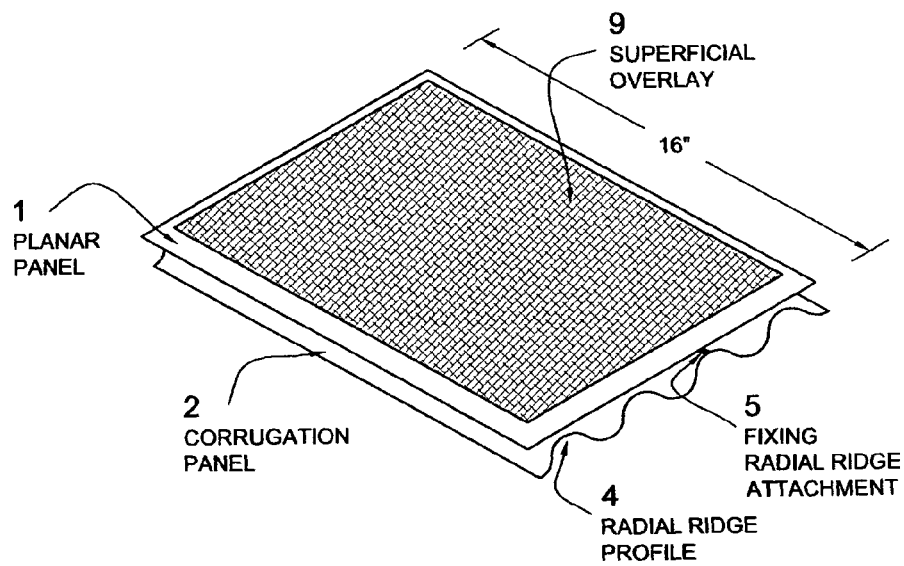

FIGS. 2 and 3 illustrate the difference between a corrugation panel with (#3) and without (#2) sections. FIGS. 2 and 3 also demonstrate use of different ridge tops utilized for a fixing radial ridge attachment (#5).

FIG. 4 illustrates a larger product comprising planar panel (#1) attached at fixing radial ridge (#5) of four sections (#3).

Figure 5:
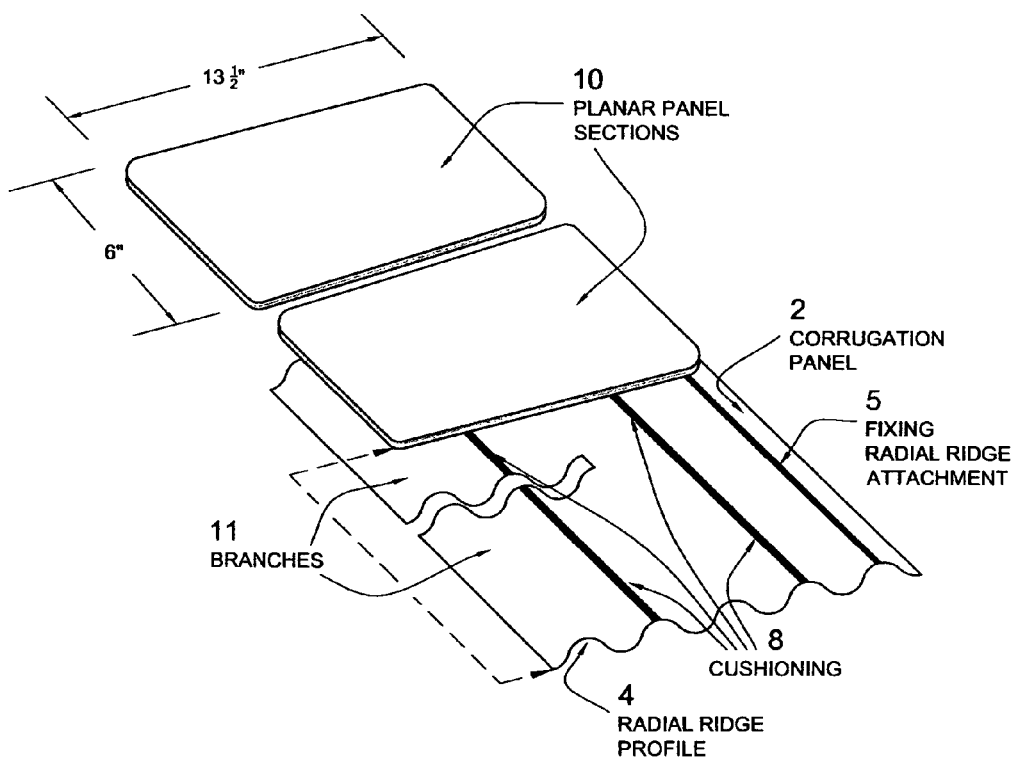
FIG. 5 demonstrates use of two planar panel sections (#10) and two corrugation panel (#2) branches (#11), and identifies the radial ridge profile (#4) of the corrugation panel (#2).

FIG. 5 demonstrates use of two planar panel sections (#10) and two corrugation panel (#2) branches (#11), and identifies the radial ridge profile (#4) of the corrugation panel (#2).

Figure 6:
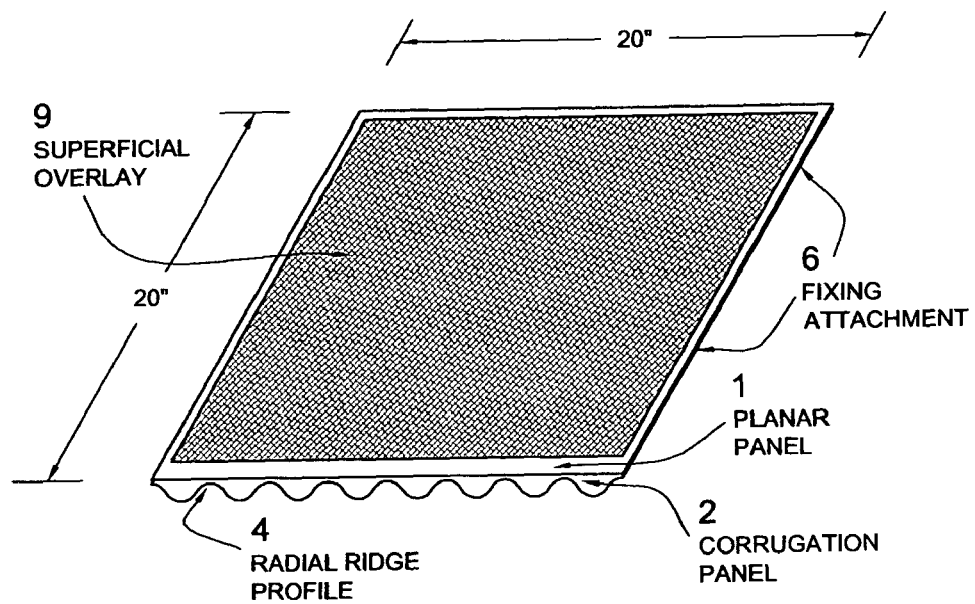
FIG. 6 identifies a fixing attachment (#6) on only one perimeter of the invention, and FIG. 7 (#7) demonstrates flex/slack attachment on two perimeters of the invention.
Figure 7:
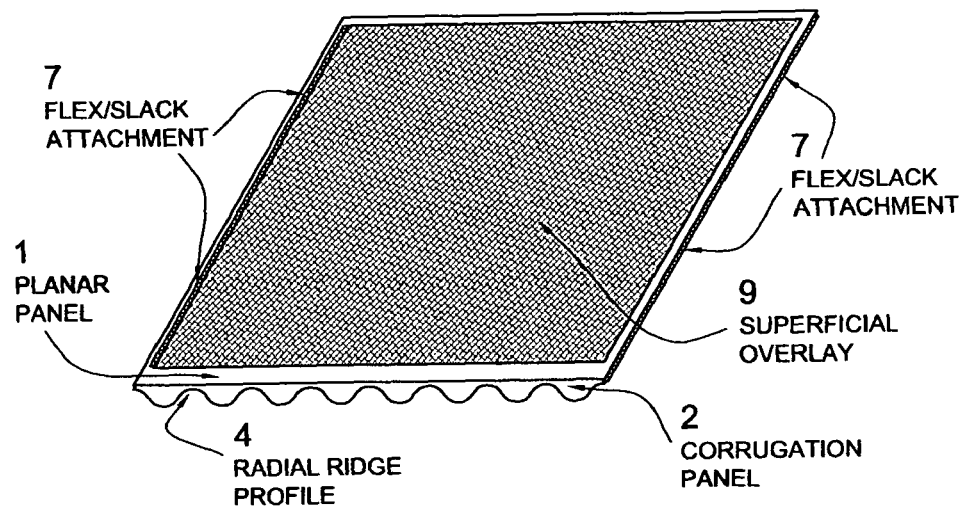
Figure 1:
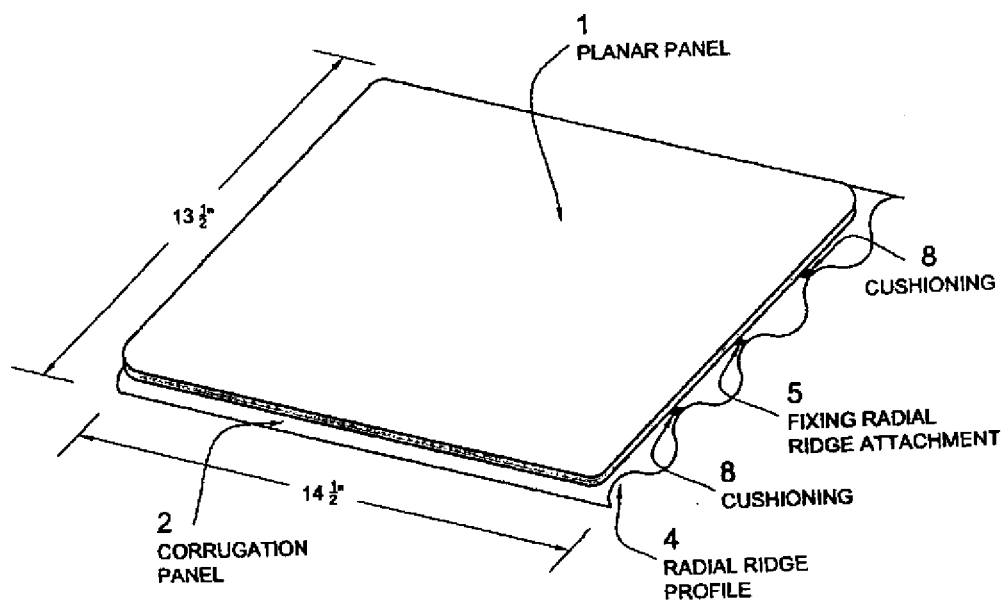
Figure 2:
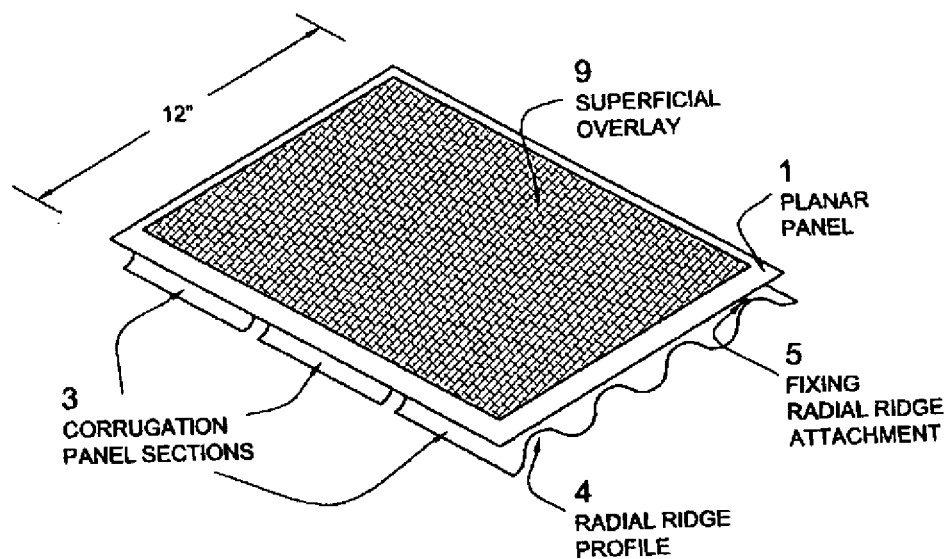
Figure 3:
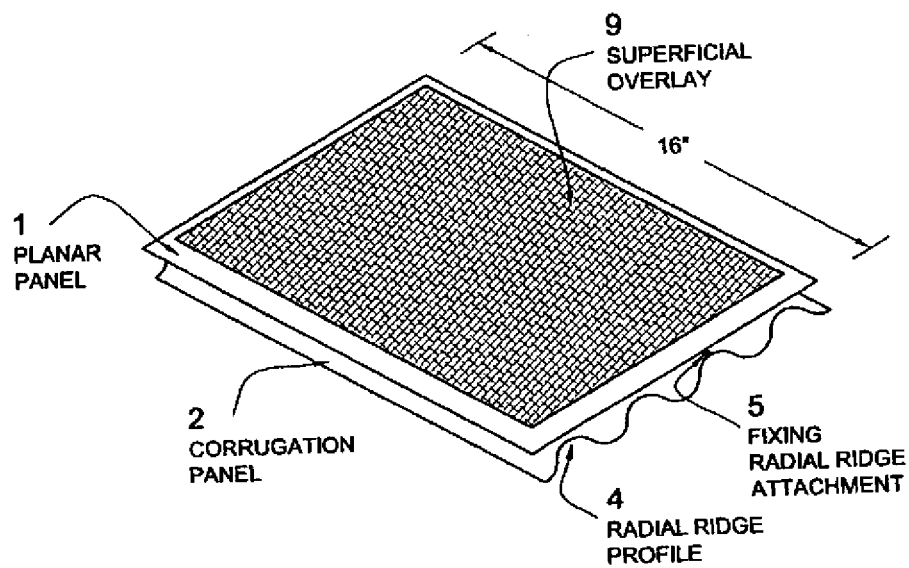
Figure 4:
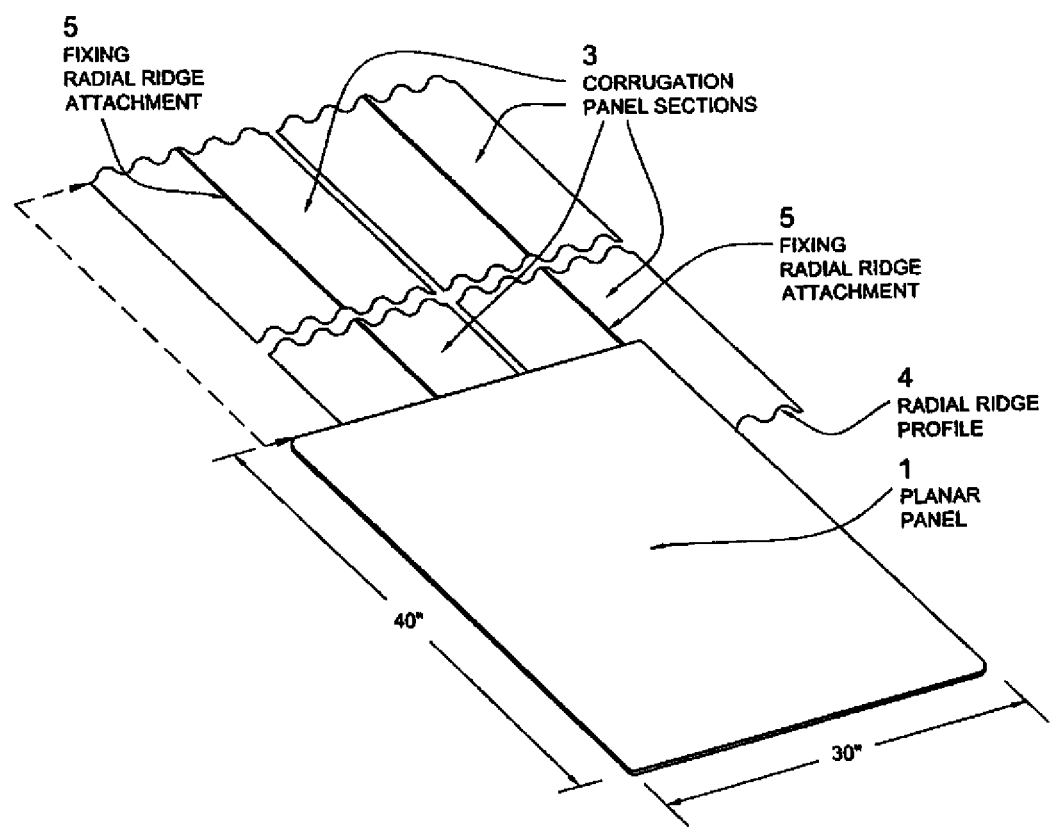
Figure 6:
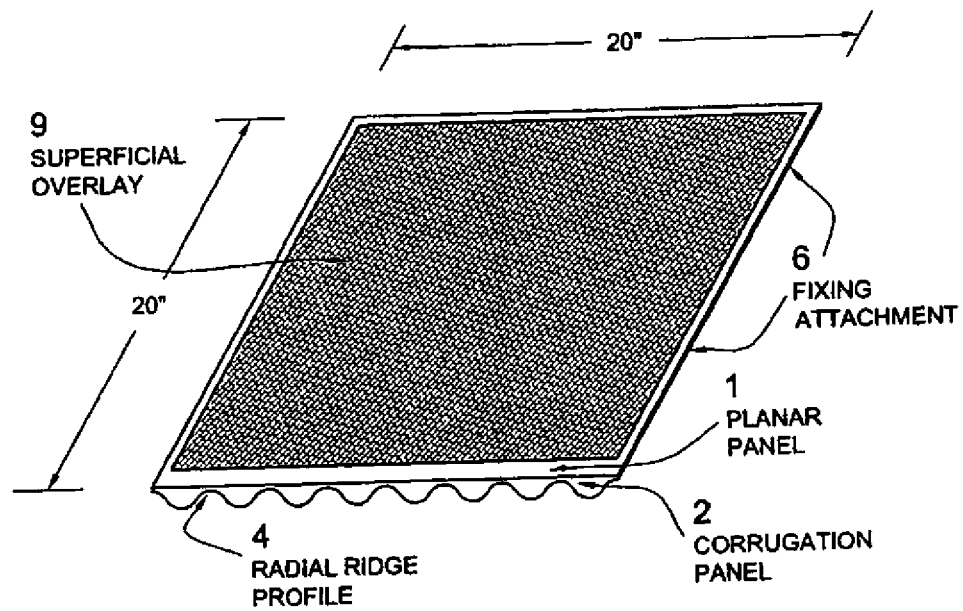
Figure 7:
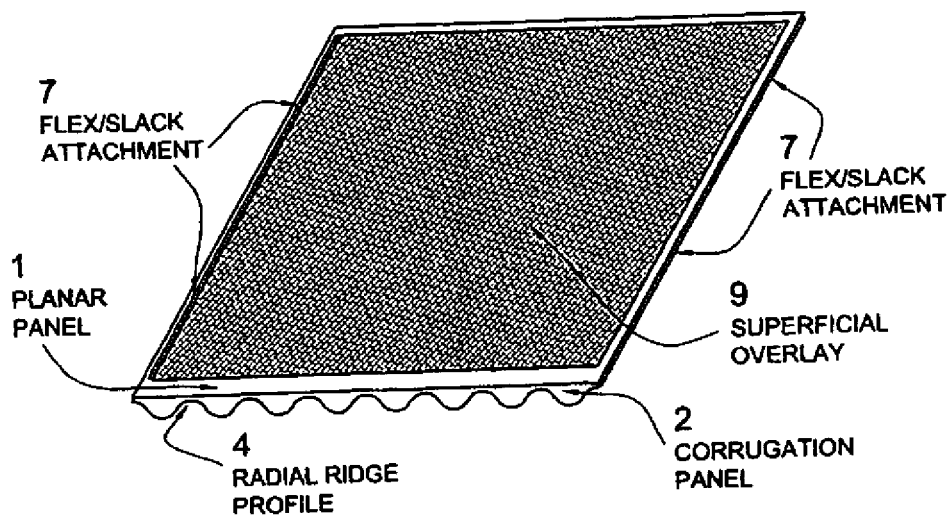

FIG. 6 identifies a fixing attachment (#6) on only one perimeter of the invention, and FIG. 7 (#7) demonstrates flex/slack attachment on two perimeters of the invention.

DETAILED DESCRIPTION OF THE INVENTION

Invention comprises a flexible planar panel, FIG. 1 (#1), aligned and united with all or part of a foamed polycarbonate corrugation panel, (#2), where a fixing attachment (#5) is usually made at a single radial ridge (#5) interface location, and can include sections, FIG. 2 (#3), where attaching at a single radial ridge location, (#5), of each section is made. FIG. 2 (#3) allows for its viscoelastic function and protects the structural integrity of the corrugation. Planar panel, FIG. 1 (#1), is usually one section, however, the planar can be two sections, FIG. 5 (#10). FIG. 4 (#3) shows the corrugation panel having four sections.

A unifying principal demonstrated in the invention is when one of the two panels is divided, the other panel is not. Providing cushioning, FIG. 1 (#8), between panels and providing superficial overlays, FIGS. 2 and 3 (#9), for comfort, aesthetics, or the like are claimed options. Sizes of the mat vary to a considerable degree, compare FIG. 1 and FIG. 4. Invention has no bias whether the corrugation(s) at their ends point up or down, or otherwise as to ridge patterns; see example of down in FIGS. 2 and 3, at radial ridge profile, (#4), and up, FIGS. 6 (#4) and 7 (#4). The up position is more compatible with flex/slack attachment, FIG. 7 (#7). Corrugated material used in the invention is likely to fatigue under load cycles going past the planar position. Inventiveness includes attachment method where two or more of corrugations expandable parts, being places, are not mutually restrained protecting corrugations structural integrity and expansion function. Desired motion can be influenced by factory selection of the planar elements size and flexibility, and with size and configuration of the corrugation panel, or its sections, or by way of branches of the same. Utility of the invention lies with user interactive values, cushioning gravity and facilitating interaction with reaction forces; producing both comfort and health. Manner of using the invention is intuitive being natural with non-static stance; here, it is passive dynamic stance through the interaction with viscoelastic function; where expansion is parallel with ridges; where the forces are generally only tactile, determined proportional to user rhythm; when user seeks only cushioning of gravity, weight shifts can be more nuanced. It is known that gravity is constant weight acting uniformly through the body, and ground reaction forces are the more deforming causes of body stress build up. It is also known that ground reaction forces are the key to muscle and bone health, where the ideal cycle is alternating stress and relaxation. Invention is effective in providing for this beneficial cycle, more nuanced seeking stance comfort, providing more motion interaction with active weight shifts. Making the invention is made obvious with the drawings, descriptions and identification of suitable materials widely used and available. When the corrugation is divided into sections, non-restraining attachment is made at each section, thereby unifying the mat. Non-restraining attachment can be provided at just one perimeter, FIG. 6 (#6), interface, where expansion will be in the opposite direction; fixing at a ridge crown location, FIG. 1 (#5), causing expansion generally, but not always in two directions; or attachment at two perimeter interfaces with flex/slack fixing, FIG. 7 (#7) FIG. 1 and FIG. 4 represent preferred embodiments of the invention described here, and In the Detailed Description of the Drawings, FIG. 1 represents mode to carry out the invention and is selected to be the featured drawing.

What I claim as my invention is:

1. An interactive stance mat comprising a flexible planar panel with or without sections, attached, aligned with foamed polycarbonate corrugation panel with radial ridge profile, with or without branches, and with or without sections with or without branches; where corrugation function under load is preserved where said attachment provides for unrestrained expansion.

2. A method of attachment for an interactive stance mat comprising a flexible planar panel with or without sections, attached aligned with foamed polycarbonate corrugation panel with radial ridge profile, with or without branches, and with or without sections with or without branches; where said method comprises said attachment, where no two of said corrugation panel expandable parts, comprising places, are mutually restrained.

3. The method of claim 2, further comprising fixing attachment with each corrugation section at a single radial ridge crown.

4. The method of claim 2, further comprising fixed attachment at one perimeter panel interface location of said mat.

5. The method of claim 2, further comprising attachment at two or more perimeter interface locations of said mat providing flex or slack attachment.

6. The stance mat of claim 1, further comprising cushioning underlying said planar panel.

7. The stance mat of claim 1, further comprising superficial overlay on said planar panel.

* * * * *